United States Patent
Czyz et al.

(10) Patent No.: US 12,203,463 B2
(45) Date of Patent: Jan. 21, 2025

(54) DEVICE FOR DAMPING PRESSURE PULSATIONS FOR A COMPRESSOR OF A CASEOUS FLUID

(71) Applicant: Hanon Systems, Daejeon (KR)

(72) Inventors: Petr Czyz, Hodslavice (CZ); Balthasar Schillemeit, Bonn (DE); Steffen Koch, Cologne (DE); Pavel Pitel, Verovice (CZ)

(73) Assignee: HANON SYSTEMS, Daejeon (KR)

( * ) Notice: Subject to any disclaimer, the term of this patent is extended or adjusted under 35 U.S.C. 154(b) by 319 days.

(21) Appl. No.: 17/596,671

(22) PCT Filed: Jul. 15, 2020

(86) PCT No.: PCT/KR2020/009307
§ 371 (c)(1),
(2) Date: Dec. 16, 2021

(87) PCT Pub. No.: WO2021/045377
PCT Pub. Date: Mar. 11, 2021

(65) Prior Publication Data
US 2022/0341411 A1   Oct. 27, 2022

(30) Foreign Application Priority Data

Sep. 5, 2019 (DE) ............... 10 2019 123 902.8

(51) Int. Cl.
*F04B 39/00* (2006.01)
*F04B 39/12* (2006.01)
(Continued)

(52) U.S. Cl.
CPC ........ *F04B 39/0061* (2013.01); *F04B 39/123* (2013.01); *F16L 55/0331* (2013.01);
(Continued)

(58) Field of Classification Search
CPC . F04B 39/0061; F04B 39/123; F16L 55/0331; F25B 2500/12; F25B 2500/13
See application file for complete search history.

(56) References Cited

U.S. PATENT DOCUMENTS 4,122,914 A * 10/1978 Suyama ................. F01N 1/082
 181/258
8,827,034 B2 * 9/2014 Czyz ................. B60H 1/00571
 181/212
(Continued)

FOREIGN PATENT DOCUMENTS

CN 102575538 A 7/2012
CN 105452778 A 3/2016
(Continued)

*Primary Examiner* — Forrest M Phillips
*Assistant Examiner* — Joseph James Peter Illicete
(74) *Attorney, Agent, or Firm* — James D. Miller; Shumaker, Loop & Kendrick, LLP (57) ABSTRACT

A process for manufacturing a device and the device for damping pressure pulsations for a compressor of a gaseous fluid, in particular a refrigerant, in a refrigerant circuit of a motor vehicle air-conditioning system. The device exhibits a housing that encompasses a chamber and features at least two outlet openings. Here, the housing is constructed between tubular connecting lines, whose ends are aligned with one another. An insert element for reducing the cross-sectional area of the pass-through opening is arranged inside at least one of the pass-through openings.

18 Claims, 3 Drawing Sheets

(51) Int. Cl.
*F16L 55/033* (2006.01)
*F16L 55/05* (2006.01)

(52) U.S. Cl.
CPC .......... *F16L 55/05* (2013.01); *F25B 2500/12* (2013.01); *F25B 2500/13* (2013.01)

(56) References Cited

U.S. PATENT DOCUMENTS

| | | | |
|---|---|---|---|
| 9,995,422 B2 * | 6/2018 | Hornik | F25B 41/40 |
| 10,337,748 B2 * | 7/2019 | Watanabe | F04B 39/0055 |
| 2016/0223232 A1 | 8/2016 | Ito et al. | |

FOREIGN PATENT DOCUMENTS

| | | | | |
|---|---|---|---|---|
| CN | 107120288 A | | 9/2017 | |
| JP | 2009228496 A | | 10/2009 | |
| JP | 2011012869 A | * | 1/2011 | ............. F04B 39/00 |
| JP | 2018162690 A | | 10/2018 | |
| KR | 100571128 B1 | | 4/2006 | |
| KR | 20070115039 A | | 12/2007 | |
| KR | 20090041729 A | | 4/2009 | |
| KR | 101658737 B1 | | 9/2016 | |
| KR | 20180077775 A | | 7/2018 | |

* cited by examiner

DEVICE FOR DAMPING PRESSURE PULSATIONS FOR A COMPRESSOR OF A GASEOUS FLUID

CROSS-REFERENCE TO RELATED PATENT APPLICATIONS

This patent application is a United States nation phase patent application based on PCT/KR2020/009307 filed on Jul. 15, 2020, which claims the benefit of German Patent Application No. 10 2019 123 902.8 filed on Sep. 5, 2019, the entire disclosures of which are hereby incorporated herein by reference.

TECHNICAL FIELD

The present invention relates to a device for damping pressure pulsations for a compressor of a gaseous fluid, in particular a refrigerant, in a refrigerant circuit of a motor vehicle air-conditioning system. The device exhibits a housing that encloses a chamber and displays at least two pass-through openings. The housing is produced between tubular connecting lines, whose ends/faces are aligned with one another.

BACKGROUND ART

Compressors for mobile applications that are known from the state of the art, particularly for air-conditioning systems in motor vehicles, and are used to pump refrigerant through a refrigerant circuit, in the following also referred to as refrigerant compressors, are often classified as variable stroke or variable displacement piston compressors or as scroll compressors, irrespective of the refrigerant. Particularly in the case of refrigerant compressors that are driven via a belt and belt pulley, the speed is determined by the speed of the motor vehicle, in particular by the rotary speed of the engine. Variable stroke piston compressors guarantee consistent operation of the air-conditioning system, as the compressor delivers a required constant or variable output regardless of the speed of the engine.

During operation of the compressor, pressure pulsations are generated and transferred to the air conditioning unit arranged in the passenger compartment via connecting lines of the refrigerant circuit. Thanks to its design, the air conditioning unit acts as a large, even surface and thereby resembles a kind of loudspeaker or amplifier for the pulsations. The noise that is generated in n circumstances, in particular at resonant frequencies, is therefore perceived directly by the driver.

For the reasons stated, conventional compressors are produced with a device for damping and reducing the pressure pulsations that occur. The function of the device for damping the pressure pulsations lies in altering a flow cross-section, in particular a sudden change in flow cross-section, for the fluid compressed by the compressor. The sudden change in flow cross-section causes an increased pressure pulsation loss, which in turn reduces the pressure pulsations that are transmitted to the vehicle interior by the connecting line of the refrigerant circuit and generate the noise.

EP 2 357 330 A1 discloses a silencer for use in a tubular component that forms a cavity with a flow channel and at least one resonator chamber. The resonator chamber is connected to the flow channel via a connection channel.

Fittings of this kind, which are installed in connecting lines, designed to act as silencers and require virtually no additional installation space, display either inadequate noise insulation or are only effective within a specific frequency range.

In addition to this, so-called reflective silencers with a housing that encloses a cylindrical volume and employs openings on the faces arranged opposite one another to allow the fluid to flow in and out are already known from the state of the art. The openings each exhibit a significantly smaller diameter than the housing, meaning that the sudden changes in diameter formed at the openings for the fluid flowing through the housing lead to a sudden change in flow cross-section. As a result of the impedance jump generated with the sudden change from the smaller internal diameter of the refrigerant circuit connecting line to the large internal diameter of the housing, or the internal volume of the silencer, the sound waves that occur as pressure pulsations in the line are damped.

As well as requiring a lot of space, the known silencers typically exhibit additional elements that need to be manufactured, as well as an internal arrangement that is complex and therefore costly to produce. This in turn increases both the time and cost of manufacturing.

DE 11 2015 000 105 T5 presents a silencer that encloses a cavity. The silencer exhibits two pot-shaped elements that are connected at open ends, which are aligned and in contact with one another, by brazing or welding. The open ends are each provided on a first face of the elements. In addition to this, a base of the pot-shaped elements is produced as a permanent component of a connecting line of a refrigerant circuit on a second face that is arranged distally to a first face. The base exhibits one pass-through opening with a smaller diameter than the connecting line.

Here, the connecting line is produced with an increased wall thickness in the area of the transition to the pot-shaped element, which, alongside increased material requirements, for example also leads to forming limitations, as well as greater costs—in particular when bending the connecting lines.

The silencers known from the state of the art require a very large installation space in order to achieve a significant damping effect. In modern motor vehicles, however, and in passenger vehicles in particular, the installation space is very limited, meaning that the intended silencers either do not achieve an adequate damping effect or that they must be removed altogether.

SUMMARY

The object of the invention lies in provision or improvement of a device for damping pressure pulsations, in particular for a compressor of a gaseous fluid in a refrigerant circuit, that offers maximum noise insulation over a broad frequency range. The objective here is in particular to achieve improved damping characteristics with improved noise damping performance over conventional silencers with the same dimensioning or at least similar damping characteristics and at least the same noise damping performance in combination with reduced device space requirements, as well as in particular to avoid a low-frequency damping drop-off. The pressure losses should be minimal. Among other things, damping of the pressure pulsations should help avoid noise emissions, which have an impact on comfort, for example for passengers sitting inside a vehicle interior. The device should exhibit a simple design, comprising a minimal number of components with minimal space requirements, minimal material usage and thereby minimal weight. In addition to this, the manufacturing and assembly costs should be minimal.

The task is solved by the subject matter with the characteristics as shown and described herein.

The task is solved by a device according to the invention for damping pressure pulsations for a compressor of a gaseous fluid, in particular a refrigerant. The device exhibits a housing that encloses a chamber with at least two pass-through openings. The housing is produced between tubular connecting lines, whose ends/faces are aligned with one another.

According to the design of the invention, an insert element for reducing the cross-sectional area of the outlet opening is arranged inside at least one of the outlet openings.

The pass-through openings, advantageously produced as openings with a circular cross-section, each preferably exhibit a diameter that corresponds to an internal diameter of the connecting lines. In particular the two pass-through openings should preferably be arranged and aligned on a common axis.

As per a further embodiment of the invention, the housing is produced with a rotation symmetrical configuration around a longitudinal axis. Here, an internal diameter of the housing is preferably larger than the internal diameter of the connecting lines.

As per an advantageous embodiment of the invention, the housing exhibits two housing elements, which are aligned with one another as first faces produced with open ends and also attached to one another on the first faces, in particular by brazing or welding. Here, each housing element can be produced as a permanent component of one end of a connecting line.

The housing elements advantageously each exhibit a base on a second face that is aligned distally to the first face in a longitudinal direction x. One pass-through opening is in particular provided within the base here.

According to another preferred embodiment of the invention, a first pass-through opening is produced as an inlet opening and a second pass-through opening is produced as an outlet opening of the chamber. The inlet opening and the outlet opening are preferably arranged and aligned on a symmetry axis of the device, in particular the longitudinal axis of the housing.

Another advantage of the invention lies in the fact that a first insert element is arranged inside the inlet opening and a second insert element is arranged inside the outlet opening to reduce the cross-sectional area of the outlet opening.

The respective insert element preferably essentially exhibits the shape of a hollow cylinder, in particular a hollow circular cylinder. Here, the insert element is preferably constructed with an external diameter that corresponds to the diameter of the pass-through opening or the internal diameter of the connecting line. After inserting the insert element into the pass-through opening, a shell surface area of the insert element is in contact with the external diameter on the perimeter wall of the pass-through opening or the internal surface of the wall of the connecting line. The insert element is held in place via an interference fit here.

As per a further embodiment of the invention, the insert element, preferably produced from a plastic, exhibits a total length $L_i$ and is arranged in such a way that it penetrates into the chamber with a certain length $L_0$. Here, the length $L_0$ that penetrates into the chamber of the insert element is lower than the total length $L_i$ and greater than or equal to zero. Alongside the total length $L_i$ and the internal diameter, the insert element can also, depending on requirements, be constructed with a length $L_0$ that penetrates into the chamber.

With integration of the at least one insert element in the device, as well as the targeted design and arrangement of the insert element, pressure pulsations of the compressor are damped, in particular also at targeted disturbing frequencies.

According to another advantageous embodiment of the invention, the first insert element is constructed with an inlet section. The inlet section exhibits a constant external diameter and a continuously reducing internal diameter in the flow direction of the fluid. The inlet section is provided at the end of the first insert element into which fluid flows.

The second insert element is preferably constructed with an outlet section that exhibits a constant external diameter and a continuously increasing internal diameter in the flow direction of the fluid. The outlet section is provided at the end of the second insert element at which fluid flows out.

The device according to the invention for damping pressure pulsations is preferably used in a refrigerant compressor of a refrigerant circuit, in particular a motor vehicle air-conditioning system.

Here, one of the pass-through openings, in particular the outlet opening of the device, is preferably connected to an intake area of the compressor, while the inlet opening is advantageously produced as a connection to a low-pressure side of the refrigerant circuit. The device is intended for use with both electrically driven and mechanically driven compressors.

The task is also solved by an inventive method for manufacturing the device according to the invention for damping pressure pulsations for a compressor of a gaseous fluid, in particular a refrigerant. This method exhibits the following steps:

Widening of one end of a connecting line up to an internal diameter of a chamber and forming the end of the connecting line as a housing element with a base and one open end or one open face.

Widening of a first housing element in the area of the widened end and producing a flange of a flange connection on the housing elements in such a way that the internal diameter of the first housing element at the open end corresponds to an external diameter of the second housing element at the open end plus sufficient play for connecting the housing elements.

Inserting prefabricated insert elements into pass-through openings produced in the housing elements.

Assembly (insertion into one another) of the housing elements, in particular insertion of the second housing element into the first housing element at the flange connection.

Fluid-tight connection of the housing elements, in particular by welding or brazing.

In summary, the device according to the invention for damping pressure pulsations for a compressor exhibits various advantages:

Reduction of disturbing pressure pulsations that negatively impact the interior acoustics of a motor vehicle or avoidance of noise emissions that have a negative effect on comfort, for example for passengers inside the vehicle.

Improved damping characteristics with improved noise damping performance over conventional silencers with the same dimensioning or at least similar damping characteristics with at least the same damping performance, while requiring less space.

Minimal pressure losses, as well as minimal influence on the power consumed by the compressor while in operation.

Simple design, comprising a minimal number of components with minimal space requirements.

Minimal manufacturing and assembly costs.

BRIEF DESCRIPTION OF DRAWINGS

Further details, features and benefits of embodiments of the invention result from the following description of embodiment examples with reference to the accompanying drawings. These display the following.

DETAILED DESCRIPTION OF AN EMBODIMENT

Figure 1:
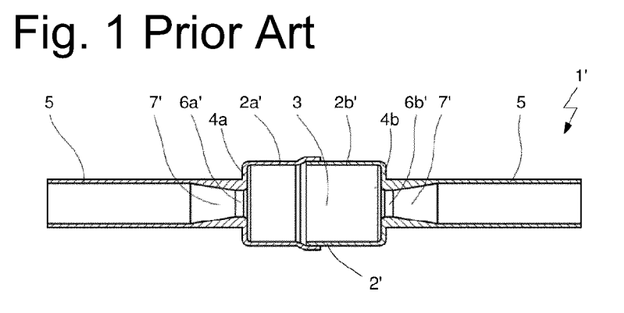
FIG. 1: A device for damping pressure pulsations for a compressor inside a chamber enclosed by a housing, shown as an axial longitudinal section from the state of the art

FIG. 1 shows a device 1' for damping pressure pulsations for a compressor inside a chamber 3 enclosed by a housing 2', provided as an axial longitudinal section from the state of the art.

The produced housing 2' that encloses the chamber 3 exhibits a first housing element 2a' and a second housing element 2b', which are attached to one another by brazing or welding at open ends that are facing and in contact with one another. The open ends are each provided on a first face of the housing elements 2a', 2b'. On a first face arranged distally relative to the second face, the housing elements 2a', 2b' each exhibit a base 4a, 4b. A pass-through opening 6a', 6b' is provided in the bases 4a, 4b of the housing elements 2a', 2b', each of which represents a permanent component of a connecting line 5 of a refrigerant circuit. The diameters of the pass-through openings 6a', 6b' are preferably identical and smaller than the internal diameter of the connecting line 5.

The connection of the connecting line 5 to the base 4a, 4b is produced with a transition area 7' in each case. Within the transition area 7', the connecting line 5 exhibits a constant external diameter, which also corresponds to the external diameter of the connecting line 5 in sections of the refrigerant circuit located away from the device 1' and expands in the area of the base 4a, 4b.

The internal diameter of the connecting line 5 is constant in the direction of the device 1' up to the transition area 7' and then continuously decreases within the transition area 7'. The internal diameter of the connecting line 5 is minimal in the area of the base 4a, 4b and corresponds to the diameter of the respective pass-through opening 6a', 6b'. The wall thickness of the connecting line 5 continuously increases in the transition area in the direction of the device 1'.

Figure 2A:
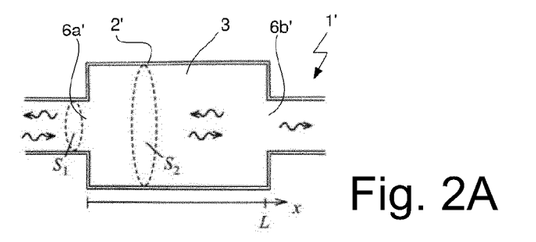
FIGS. 2A and 2B: A comparison between a conventional device and a device according to the invention for damping pressure pulsations for a compressor, each shown as an axial longitudinal section with calculation parameters
Figure 2B:
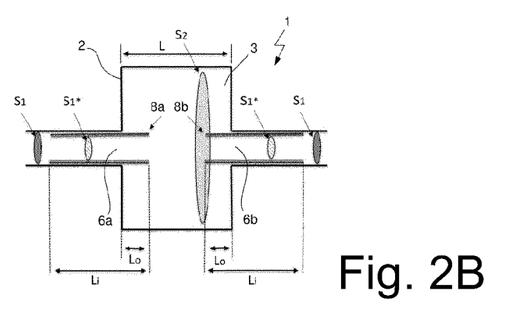

FIGS. 2A and 2B provide a comparison between a conventional device 1' and a device according to the invention 1 for damping pressure pulsations for a compressor, each shown as an axial longitudinal section with calculation parameters.

The damping behaviour $D_{TL}$ of a reflective silencer, also known as the transmission loss coefficient $D_{TL}$, can be calculated on the basis of the frequency or wavelength to be damped and the installation space available using the following formula (source: Wallin, H.-P., Carlsson, U., Abom, M., Boden, H., & Glab, R. (2012). Sound and vibration [Book]. Stockholm, Sweden: The Marcus Wallenberg Laboratory.):

$$D_{TL} = 10\log\left(1 + \left(\frac{S_1}{2 \cdot S_2} - \frac{S_2}{2 \cdot S_1}\right)^2 \sin^2(kL)\right)[\text{dB}]$$

The installation space is dictated by the internal diameter of the chamber 3. The inner volume of the chamber 3 or the volume enclosed by the housing 2' is defined on the basis of the length L in the longitudinal direction x, as well as the cross-sectional area $S_2$. $S_1$ corresponds to the cross-sectional area of the pass-through openings 6a', 6b' for fluid entry into the chamber 3, as well as for fluid exit from the chamber 3, while k corresponds to the wave number as $k=2\pi/\lambda$. As a result, the damping behaviour $D_{TL}$ of the device 1' produced as a reflective silencer is also dependent on the flow cross-section $S_1$ of the inlet opening 6a' and the outlet opening 6b', as well as the inner flow cross-section $S_2$ of the chamber 3.

When fluid flows through the device 1' with the chamber 3 and the pass-through openings 6a', 6b', the pressure pulsations are reduced by the level of transmission loss coefficient $D_{TL}$.

Consequently, the damping behaviour $D_{TL}$ of a reflective silencer is determined by the length of the chamber 3, in particular the inner volume of the chamber 3, and an expansion ratio. The expansion ratio is understood to mean the ratio between the internal diameter of the chamber 3 and the diameter of the pass-through openings 6a', 6b'.

In order to improve the damping behaviour $D_{TL}$ of the reflective silencer with constant inner volume of the chamber 3, in particular with consistent length L and consistent cross-sectional area $S_2$ (in other words essentially the same housing 2 with constant installation space), the cross-sectional area $S_1$ of the pass-through openings 6a, 6b, in particular inlet opening 6a or outlet opening 6b, can be reduced to a cross-sectional area $S_1^*$. In particular, this changes the expansion ratio.

The expansion ratio, and thereby the damping behaviour $D_{TL}$, of the reflective silencers can also be kept constant with a smaller installation space.

As can in particular be seen in FIG. 2B, the cross-sectional areas of the pass-through openings 6a, 6b of the device 1 are each reduced by the arrangement of an insert element 8a, 8b. Firstly, a length $L_i$ of the area that changes the cross-section of the insert elements 8a, 8b has an effect on the damping behaviour $D_{TL}$. Secondly, the damping behaviour $D_{TL}$ is also influenced by the insert elements 8a, 8b reaching into the chamber 3. Here, the insert elements 8a, 8b are arranged with a section of length $L_O$ inside the chamber 3.

Figure 3A:
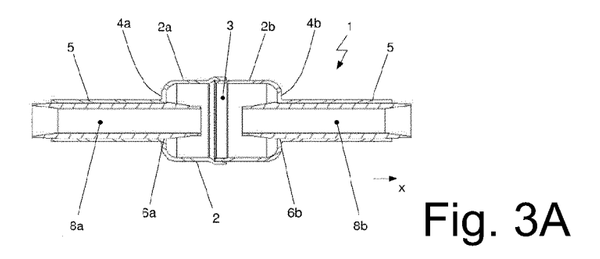
FIG. 3A: A device according to the invention for damping pressure pulsations for a compressor with insert elements inside the chamber enclosed by the housing, shown as an axial longitudinal section

FIG. 3A shows an embodiment of a device according to the invention 1 for damping pressure pulsations for a compressor with insert elements 8a, 8b inside a chamber 3 that is enclosed by the housing 2, depicted as an axial longitudinal section.

The housing 2 is produced with a first housing element 2a and a second housing element 2b. The housing elements 2a, 2b are aligned with one another, with the open ends arranged in contact, and then connected to one another in particular by brazing or welding. Here, the housing elements 2a, 2b are each arranged with a first face facing each other. On a first face that is aligned distally in the longitudinal direction x to the second face, the housing elements 2a, 2b each exhibit a base 4a, 4b. The housing elements 2a, 2b are produced with the bases 4a, 4b each as a permanent component of a connecting line 5 of a refrigerant circuit. One pass-through opening 6a, 6b is provided within each of the bases 4a, 4b. The diameters of the pass-through openings 6a, 6b and the internal diameters of the connecting lines 5 are preferably identical.

The connecting lines 5 are produced with both a constant external diameter and a constant internal diameter, in other words with a constant wall thickness.

With the pass-through openings 6a, 6b, the housing 2 that encloses the chamber 3 exhibits an inlet opening 6a, as well as an outlet opening 6b, each of which are produced in the base 4a, 4b of the housing elements 2a, 2b. The fluid that is to be compressed when flowing through the compressor flows through the connecting line 5 and the inlet opening 6a in the longitudinal direction x into the chamber 3 of the device 1 and then back out the chamber 3 and into the connecting line 5 through the outlet opening 6b. Here, the inlet opening 6a is produced as a connection to a low-pressure side of the refrigerant circuit, while the outlet opening 6b is connected to an intake area of the compressor via the connecting line 5. The inlet opening 6a and the outlet opening 6b are aligned with one another coaxially, i.e. on a common axis, which also corresponds to the symmetry axis or the longitudinal axis of the device 1.

Figure 3B:
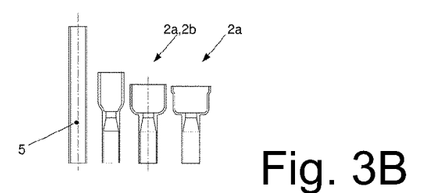
FIG. 3B: Various conditions of a housing element of the device housing as per FIG. 3A during manufacture

When manufacturing the device 1, a pressing tool is used to widen one end of a connecting line 5 up to a final diameter in a cold forming process, wherein the end of the connecting line 5 then represents a housing element 2a, 2b with the base 4a, 4b. FIG. 3B shows the first housing element 2a of the housing 2 of the device 1 as per FIG. 3A in four different conditions and the second housing element 2b in three different conditions, each during manufacture.

After widening two connecting lines 5 up to an internal diameter of the chamber 3 to be produced later in two shown steps, the first housing element 2a is widened further at the open end in a further step, in particular a third step shown, in order to produce a flange for the flange connection of the housing elements 2a, 2b. The first housing element 2a is widened on the open face in such a way that the internal diameter then corresponds to the external diameter of the second housing element 2b in the widened section plus enough play to connect the housing elements 2a, 2b to one another.

After inserting the prefabricated insert elements 8a, 8b into the housing elements 2a, 2b and connecting the housing elements 2a, 2b with one another, in particular inserting the second housing element 2b into the first housing element 2a, the housing elements 2a, 2b are, for example, brazed or welded to one another in order to guarantee a fluid-tight connection of the housing 2.

The essentially hollow cylinder-shaped, specifically circular hollow cylinder-shaped, insert elements 8a, 8b, in particular to reduce the cross-sectional areas $S_1$ of the pass-through openings 6a, 6b, are preferably manufactured from a plastic and exhibit an external diameter that corresponds to the internal diameter of the connecting line 5. This secures fluid-tight insertion of the insert element 8a, 8b into the respective housing element 2a, 2b, in particular via an interference fit. Here, fluid-tight insertion is understood to mean that the outer shell surface area of the insert element 8a, 8b is in fluid-tight contact with the internal surface of the connecting line 5 and thereby that the entire mass flow of the fluid is guided through the respective insert element 8a, 8b. Any occurrence of a bypass flow of the fluid on the outside of the insert element 8a, 8b is prevented. The insert elements 8a, 8b, preferably produced from a plastic, are to be formed very flexibly, wherein the use of other easily formable materials can be provided for the insert elements 8a, 8b.

The insert elements 8a, 8b are matched to the necessary areas of application, in particular the specific frequency ranges in which targeted damping is to be achieved, in terms of their shape, in particular with regard to their total length $L_1$ and cross-sectional area $S_1^*$. Alongside the total length $L_O$ and an internal diameter of the insert element 8a, 8b, the length $L_O$ of the insert element 8a, 8b can also be varied inside the chamber 3.

When the housing elements 2a, 2b have been assembled and connected, the device 1 preferably exhibits a length of around 50 mm and external diameter of around 37 mm with a wall thickness of around 1.5 mm. In the area where they are connected to one another, the housing elements 2a, 2b are arranged with an overlap of around 5 mm to one another.

Construction of a conventional device 1' with an internal diameter of the chamber 3 of 48 mm and an internal diameter of the connecting lines 5 of 16 mm results in an expansion ratio of 3. In the case of a space-saving embodiment of the device 1 with an internal diameter of the chamber 3 of 36 mm and the same length L, the diameter of the pass-through openings 6a, 6b is reduced to 12 mm in order to keep the expansion ratio, and thereby also the damping behaviour $D_{TL}$, constant. Alongside the same length L and expansion ratio, the device according to the invention 1 also delivers the same performance as the conventional device 1'.

Figures 4, 5A:
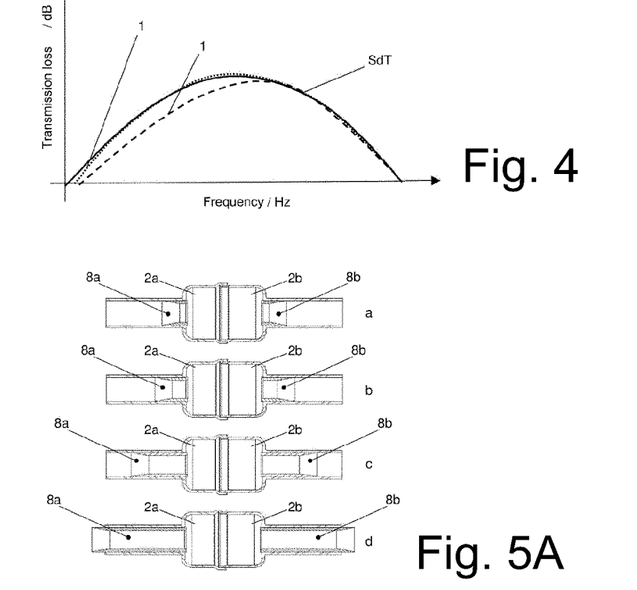
FIG. 4: A comparison between transmission losses or damping behavior of conventional silencers and a device according to the invention for damping pressure pulsations based on frequency
FIGS. 5A and 5B: Detailed depictions of the device for damping pressure pulsations for a compressor under variation of the total length of the insert element with constant internal diameter, as well as comparison of transmission losses or damping behaviour of the devices based on frequency, as well as FIGS. 6A and 6B: Detailed depictions of the device for damping pressure pulsations for a compressor under variation of the internal diameter of the insert element with constant total length and length that reaches both into the volume of the device and into the connecting line of the insert element, as well as comparison of transmission losses or damping behaviour of the devices based on frequency.

FIG. 4 compares transmission losses or damping behaviour based on the frequency of a reflective silencer known from the state of the art, a conventional device 1' as per FIG. 1 and a device according to the invention 1 as per FIG. 3A for damping pressure pulsations within a refrigerant circuit that employs R134a as the refrigerant.

It becomes clear here that the device according to the invention 1 in the space-saving embodiment can close a gap that occurs in the damping behaviour, in particular in the low frequency range, for example in the range up to around 800 Hz, between a reflective silencer known from the state of the art and the conventional device 1' as per FIG. 1. Particularly in the stated frequency range, the pressure pulsation damping performance of the device 1 is greater than that of the conventional device 1'.

Figure 5B:
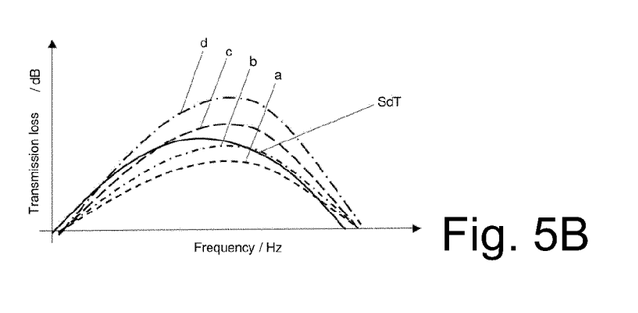

FIGS. 5A and 5B show and compare detailed depictions of the device 1 for damping pressure pulsations for a compressor, in particular the housing elements 2a, 2b with the insert elements 8a, 8b, under variation of the total length $L_i$ of the insert elements 8a, 8b with a constant internal diameter of 12 mm, as well as the transmission losses or damping behaviour of the device 1 with the various insert elements 8a, 8b based on the frequency inside a refrigerant circuit. The insert elements 8a, 8b are each arranged in such a way that they do not reach into the chamber 3 of the device 1. The length $L_O$ of the insert elements 8a, 8b inside chamber 3 is therefore zero in each case.

The total length $L_i$, of the insert elements 8a, 8b varies between 5 mm (a), 10 mm (b), 25 mm (c) and 50 mm (d), while the internal diameter exhibits the value of 12 mm.

FIG. 5B clearly shows that the damping behaviour of the device 1 is improved with increasing total length $L_i$, of the insert elements 8a, 8b.

Figure 6A:
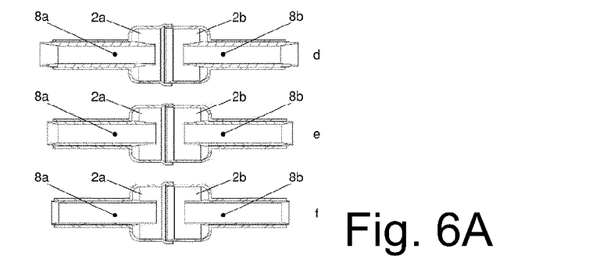
Figure 6B:
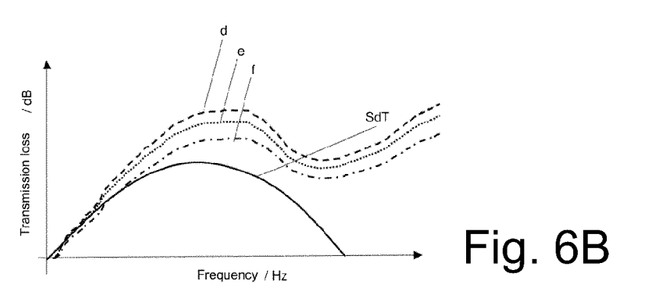

FIGS. 6A and 6B provide a comparison that includes detailed depictions of the device 1 for damping pressure pulsations for a compressor, in particular the housing elements 2a, 2b with the insert elements 8a, 8b, under variation of the internal diameter of the insert elements 8a, 8b, each with constant total length $L_i$, and constant length $L_O$ penetrating into both the volume of the device 1 and the connecting line 5, as well as the transmission losses or damping behaviour of the devices 1 with the various insert elements 8a, 8b based on the frequency inside a refrigerant circuit. The total length $L_i$, of the insert elements 8a, 8b is 65 mm in each case, while the insert elements 8a, 8b are each arranged in such a way that they reach into the chamber 3 of the device 1 with a length $L_O$ of 15 mm.

The internal diameter of the insert elements 8a, 8b varies between 11 mm (d), 12 mm (e) and 13 mm (f).

FIG. 6B clearly shows that the damping behaviour, in particular the high-frequency damping behaviour of the device 1, is improved over a known reflective silencer above a certain frequency. In addition to this, the damping behaviour of the device 1 is in particular improved as the internal diameter of the insert elements 8a, 8b is reduced.

With the production and arrangement of the insert elements 8a, 8b inside the housing elements 2a, 2b, a desired internal geometry of the device 1 is created which in particular increases the low-frequency pressure pulsation damping effect and, at the same time, reduces the drop in pressure when the fluid flows through the device 1.

Consequently, the improved pressure pulsation damping effect primarily occurs in operating states with a low mass flow to be transported, and thereby a low compressor load, which should be considered highly critical in the context of pressure pulsations in vehicles.

As shown in particular by FIGS. 5A and 6A, the first insert elements 8a are each produced with an inlet section. Inside the inlet section, the insert element 8a exhibits an internal diameter that reduces in the flow direction of the fluid and then remains constant from the end of the inlet section, while maintaining a constant external diameter. The wall thickness of the first insert element 8a inside the inlet section is therefore continuously reduced in the direction of the chamber 3.

The internal diameter of the second insert element (not shown) in the flow direction of the fluid is also constant up to an outlet section and then increases continuously inside the outlet section, meaning that the wall thickness of the second insert element inside the outlet section continuously decreases in the direction away from the chamber 3.

The internal diameter of each of the insert elements 8a, 8b is minimal in the area of the end open to the chamber 3.

LIST OF REFERENCE NUMBERS

1, 1' Device
2, 2' Housing
2a, 2a.' First housing element
2b, 2b' Second housing element
3 Chamber
4a Base of the first housing element 3a
4b Base of the second housing element 3b
5 Connecting line
6a, 6a.' Pass-through opening, inlet opening, fluid flow path
6b, 6b' Pass-through opening, outlet opening, fluid flow path
7' Transition area
8a First insert element
8b Second insert element
$D_{TL}$ Damping behaviour, transmission loss coefficient
$S_1$ Cross-sectional area of pass-through openings 6a, 6b, 6a.', 6b'
$S_1^*$ Reduced cross-sectional area
$S_2$ Cross-sectional area with inner volume of chamber 3 in the longitudinal direction x
L Length of inner volume of chamber 3
$L_i$ Length of altered cross-section area, length of insert element 8a, 8b
$L_O$ Length of insert element 8a, 8b inside chamber 3
k Wave number
λ Wavelength
x Longitudinal direction

The invention claimed is:

1. A device for damping pressure pulsations for a compressor of a gaseous fluid, the device comprising:
    a housing that encompasses a chamber and features at least two pass-through openings, wherein the housing is constructed between tubular connecting lines of a refrigerant circuit, whose ends are aligned with one another, and
    an insert element for reducing a cross-sectional area of at least one of the pass-through openings arranged inside the at least one of the pass-through openings, wherein a first one of the pass-through openings is constructed as an inlet opening and a second one of the pass-through openings is constructed as an outlet opening of the chamber, wherein the insert element comprises a first insert element and a second insert element, the first insert element arranged inside the inlet opening and the second insert element arranged inside the outlet opening for reducing the cross-sectional area of the inlet opening and the outlet opening, wherein the pass-through openings are connected to the tubular connecting lines of the refrigerant circuit, and the insert elements are inserted into the tubular connecting lines, and wherein each of the first insert element and the second insert element is constructed with a total length (Li), and the total length (Li) is shorter than the length of the tubular connecting lines.

2. The device according to claim 1, wherein each of the pass-through openings exhibits a diameter that corresponds to an inside diameter of the connecting lines.

3. The device according to claim 1, wherein the pass-through openings are arranged and aligned on a common axis.

4. The device according to claim 1, wherein the housing is produced around a longitudinal axis with rotational symmetry.

5. The device according to claim 1, wherein the housing exhibits two housing elements that are aligned with one another with first faces that are constructed as open ends and are connected to one another on the first faces.

6. The device according to claim 5, wherein each of the housing elements is constructed as a permanent component of one end of the connecting lines.

7. The device according to claim 5, wherein each of the housing elements exhibits a base on a second face that is aligned distally to each of the first faces in a longitudinal direction x.

8. The device according to claim 7, wherein one of the pass-through openings is constructed inside each of the bases.

9. The device according to claim 1, wherein the inlet opening and the outlet opening are arranged and aligned on a symmetry axis of the device.

10. The device according to claim 1, wherein each of the first insert element and the second insert element essentially exhibit a shape of a hollow cylinder.

11. The device according to claim 10, wherein each of the first insert element and the second insert element exhibit an external diameter that essentially corresponds to an inside diameter of each of the connecting lines.

12. The device according to claim 1, wherein the first insert element and the second insert element are arranged with a length ($L_o$) projecting into the chamber, and wherein the length ($L_o$) is less than the total length ($L_i$) and is greater than or equal to zero.

13. The device according to claim 1, wherein the first insert element and the second insert element are constructed from a plastic.

14. The device according to claim 1, wherein the first insert element is constructed with an inlet section that exhibits a constant external diameter and a continuously reducing internal diameter in a flow direction of the fluid.

15. The device according to claim 1, wherein the second insert element is constructed with an outlet section that exhibits a constant external diameter and a continuously expanding internal diameter in a flow direction of the fluid.

16. The device according to claim 1, wherein a first one of the pass-through openings is connected to an intake area of the compressor.

17. A process for manufacturing the device for damping pressure pulsations for the compressor of the gaseous fluid according to claim 1, exhibiting the following steps:
   widening of one end of the connecting line up to an internal diameter of the chamber and forming the one end of the connecting line as housing elements with a base and one open end;
   widening of a first housing element in the area of the widened end and creating a flange for a flange connection of the housing elements in such a way that an internal diameter of the first housing element at the open end corresponds to an external diameter of a second housing element at the open end with enough play to connect the housing elements;
   insertion of prefabricated ones of the first insert element and the second insert element into the pass-through openings produced in the housing elements; and
   insertion of the housing elements into one another at the flange connection, as well as fluid-tight connection of the housing elements.

18. The device for damping pressure pulsations for the compressor of the gaseous fluid according to claim 1, wherein the device is disposed in a refrigerant circuit of a motor vehicle air-conditioning system.

* * * * *